(12) United States Patent
Zhao (10) Patent No.: US 12,218,842 B2
(45) Date of Patent: Feb. 4, 2025

(54) DATA COMMUNICATION METHOD, SERVER DEVICE, CLIENT DEVICE AND MEDIUM

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 807 days.

(21) Appl. No.: 17/279,643

(22) PCT Filed: Sep. 16, 2019

(86) PCT No.: PCT/CN2019/105971
§ 371 (c)(1),
(2) Date: Mar. 25, 2021

(87) PCT Pub. No.: WO2020/063381
PCT Pub. Date: Apr. 2, 2020

(65) Prior Publication Data
US 2021/0399986 A1   Dec. 23, 2021

(30) Foreign Application Priority Data
Sep. 30, 2018   (CN) .......................... 201811158708.4

(51) Int. Cl.
*H04L 47/12* (2022.01)
*H04L 47/24* (2022.01)
(52) U.S. Cl.
CPC .............. *H04L 47/12* (2013.01); *H04L 47/24* (2013.01)

(58) Field of Classification Search
CPC ................................. H04L 47/12; H04L 47/24
See application file for complete search history.

(56) References Cited

U.S. PATENT DOCUMENTS 10,380,198 B2 * 8/2019 Xu .......................... G06F 16/951
2005/0022047 A1 * 1/2005 Chandrasekaran ..........................
G06F 16/2343
707/E17.007
(Continued)

FOREIGN PATENT DOCUMENTS

CN   102014143 A   4/2011
CN   102664950 A   9/2012
(Continued)

OTHER PUBLICATIONS

Indian Office Action from Indian Patent Application No. 202117019343 dated Dec. 7, 2022.

*Primary Examiner* — Khaled M Kassim
(74) *Attorney, Agent, or Firm* — Dilworth & Barrese, LLP.; Michael J. Musella, Esq.

(57) ABSTRACT

A data communication method, a server device, a client device, and a medium are disclosed, the data communication method includes: receiving at least one resource transmission request sent from at least one entity, the resource transmission request including a resource identifier associated with a resource and a priority identifier associated with the resource transmission request; storing the at least one resource identifier according to the priority identifier; acquiring the resource from the entity according to the stored resource identifier of the resource transmission request.

11 Claims, 3 Drawing Sheets

(56) References Cited

U.S. PATENT DOCUMENTS

| | | | |
|---|---|---|---|
| 2005/0246340 A1* | 11/2005 | Smith | G06F 13/1605 707/999.009 |
| 2007/0223456 A1* | 9/2007 | Maruyama | H04L 12/66 370/352 |
| 2008/0162760 A1* | 7/2008 | Jacob | G06F 13/1642 710/244 |
| 2009/0006526 A1* | 1/2009 | Gingell, Jr. | G06F 9/5055 709/202 |
| 2010/0202391 A1* | 8/2010 | Palanki | H04W 72/27 370/329 |
| 2011/0179071 A1* | 7/2011 | Torr | G06F 16/435 707/769 |
| 2011/0289506 A1* | 11/2011 | Trivi | G06F 9/526 718/104 |
| 2012/0069382 A1* | 3/2012 | Osada | G03G 15/5075 358/1.14 |
| 2013/0031060 A1* | 1/2013 | Lowery | G06F 16/958 707/689 |
| 2013/0130221 A1* | 5/2013 | Kortemeyer | G09B 5/12 434/362 |
| 2014/0064297 A1* | 3/2014 | Hirota | H04J 3/0667 370/412 |
| 2014/0269270 A1 | 9/2014 | Wolcott et al. | |
| 2014/0317070 A1* | 10/2014 | Kesavan | G06F 16/2365 707/703 |
| 2015/0143053 A1* | 5/2015 | Quimbey | G06F 12/0888 711/133 |
| 2015/0277765 A1 | 10/2015 | Watanabe et al. | |
| 2015/0373111 A1* | 12/2015 | Fukui | H04L 67/1012 709/213 |
| 2016/0277315 A1* | 9/2016 | Miller | G06F 16/9537 |
| 2016/0301611 A1 | 10/2016 | Li et al. | |
| 2016/0366183 A1* | 12/2016 | Smith | H04L 63/06 |
| 2018/0184431 A1* | 6/2018 | Li | H04W 52/281 |
| 2018/0253237 A1* | 9/2018 | Borlick | G06F 3/0635 |
| 2018/0316799 A1* | 11/2018 | Shaw | H04L 41/0806 |
| 2019/0102424 A1* | 4/2019 | Koszek | H04L 67/04 |
| 2019/0116589 A1* | 4/2019 | Shimomura | H04L 5/0055 |
| 2019/0188047 A1* | 6/2019 | Dao | G06F 9/5077 |
| 2020/0037345 A1* | 1/2020 | Ryoo | H04W 74/0833 |
| 2020/0366624 A1* | 11/2020 | Miller | G06F 16/9537 |
| 2021/0328887 A1* | 10/2021 | Zhao | H04L 67/51 |

FOREIGN PATENT DOCUMENTS

| | | |
|---|---|---|
| CN | 102724713 A | 10/2012 |
| CN | 105391486 A | 3/2016 |
| CN | 105468305 A | 4/2016 |
| CN | 106789726 A | 5/2017 |
| CN | 104702531 B | 4/2018 |

* cited by examiner

DATA COMMUNICATION METHOD, SERVER DEVICE, CLIENT DEVICE AND MEDIUM

CROSS-REFERENCE TO RELATED APPLICATION

The present application claims priority of Chinese Patent Application No. 201811158708.4 filed on Sep. 30, 2018, and the entire content disclosed by the Chinese patent application is incorporated herein by reference as part of the present application.

TECHNICAL FIELD

The present disclosure relates to a field of Internet of Things, and in particular to a method for data transmission control in an Internet of Things system, a server device, a client device, and a medium.

BACKGROUND

Congestion may occur in a data communication process of an Internet of Things (IOT) system, and common congestion includes network congestion, storage congestion etc. When the congestion occurs, the server cannot process received data in time, so that a buffer cannot receive new data. The network congestion in the IOT is mainly caused by the network being unable to process the network data in time due to excessive network load.

In an environment with large amount of information flow, a client can send data to a server. If the server fails to process the received data in time, the storage space will be overfull, which will cause system congestion. In this circumstance, the client will retransmit the data, and the retransmitted information plus the newly transmitted information will further aggravate the congestion of the system and cause a vicious circle of the whole system.

SUMMARY

Therefore, the present disclosure provides a data communication method, a server device, a client device, and a medium.

According to an aspect of the present disclosure, a data communication method is provided and comprises: receiving at least one resource transmission request sent from at least one entity, the resource transmission request comprising a resource identifier associated with a resource and a priority identifier associated with the resource transmission request; storing the at least one resource transmission request according to the priority identifier; and acquiring the resource from the entity according to the resource identifier, which is stored, of the resource transmission request.

In some embodiments, the at least one resource transmission request at least comprises at least one resource transmission request with a first priority and at least one resource transmission request with a second priority, and acquiring the resource from the entity according to the resource identifier that is stored, comprises: after acquiring a resource corresponding to the at least one resource transmission request with the first priority from the entity, acquiring a resource corresponding to the at least one resource transmission request with the second priority from the entity.

In some embodiments, storing the at least one resource transmission request according to the priority identifier comprises: establishing a first storage queue, which is configured to store a resource transmission request with the first priority; establishing a second storage queue, which is configured to store a resource transmission request with the second priority.

In some embodiments, the data communication method further comprises: discarding a resource transmission request with a third priority in the resource transmission request.

In some embodiments, the data communication method further comprises: processing the resource transmission request in the first storage queue in a first-in-first-out manner. The resource transmission request with the first priority is sequentially stored into the first storage queue according to an order in which the resource transmission request is received, and the resource transmission request in the first storage queue is sequentially processed according to an order in which the resource transmission request in the first storage queue is stored.

In some embodiments, acquiring the resource from the entity according to the resource identifier that is stored, comprises: sending the resource identifier to the entity; and receiving the resource corresponding to the resource identifier sent by the entity.

In some embodiments, the priority identifier is determined according to a type of the resource or a priority of the resource.

In some embodiments, the resource identifier is determined according to a timestamp and/or according to a resource identification code of the resource.

According to another aspect of the present disclosure, a data communication method is provided and comprises: creating a resource transmission request, the resource transmission request comprising a resource identifier associated with a resource; sending the resource transmission request to an entity; in a case of receiving a response from the entity, sending a corresponding resource to the entity according to the resource identifier comprised in the response.

In some embodiments, the resource transmission request further comprises a priority identifier, and the priority identifier indicates a priority of the resource transmission request.

In some embodiments, the priority identifier is determined according to a type of the resource or a priority of the resource.

In some embodiments, the data communication method further comprises: receiving a resource sent by an application entity and setting the priority for the resource transmission request; saving the resource, and creating a resource transmission request for the resource and setting a resource identifier associated with the resource.

In some embodiments, sending the corresponding resource to the entity according to the resource identifier comprised in the response, comprises: searching the corresponding resource according to the resource identifier comprised in the response; and sending the corresponding resource corresponding to the resource identifier to the entity.

In some embodiments, the resource identifier is determined according to a timestamp when the resource is received and/or according to a resource identification code of the resource.

In some embodiments, the timestamp is a unix timestamp.

According to an aspect of the present disclosure, a server device is provided and includes a processor, and the processor is configured to execute the method as described above.

According to an aspect of the present disclosure, a client device is provided and includes a processor, and the processor is configured to execute the method as described above.

According to an aspect of the present disclosure, a computer-readable storage medium is provided, computer program instructions are stored on the computer-readable storage medium, and when the computer program instructions are executed by a processor, the method as described above is implemented.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the disclosure. For those of ordinary skill in the art, other drawings can be obtained based on these drawings without creative work. The following drawings are not deliberately scaled and drawn according to the actual size and proportions, and the focus is to show the gist of the present disclosure.

DETAILED DESCRIPTION

In order to make objects, technical solutions and advantages of the embodiments of the present disclosure more apparent, the following examples are used to further illustrate the present disclosure in detail. Apparently, the described embodiments are just a part but not all of the embodiments of the present disclosure. Based on the described embodiments of the present disclosure, those skilled in the art can obtain other embodiment(s), without any inventive work, which should be within the protection scope of the present disclosure.

Figure 1:
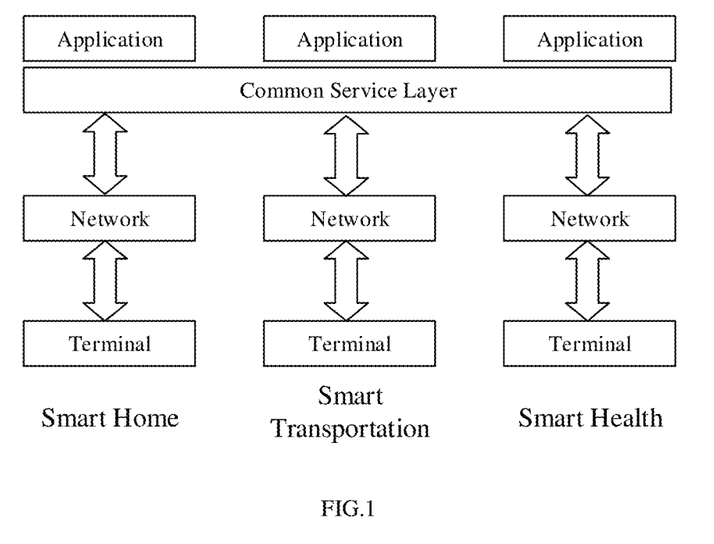
FIG. 1 illustrates a schematic architecture diagram of an IOT according to the present disclosure.

With the development of information technology, especially Internet technology, the IOT technology for achieving informationization, remote management control, and intelligent network is gradually maturing. The IOT connects sensors, controllers, machines, people, things, and the like together in new ways by communication technologies such as local networks or the Internet, thereby forming a connection between people and things, and a connection between things and things. The IOT is an extension of the Internet, includes the Internet and all resources on the Internet, and is compatible with all applications of the Internet. With the application of the IOT technology in various fields, many new application fields, such as smart home, smart transportation, smart health etc., have emerged. As shown in FIG. 1, client devices of various terminals are connected to the network and to a common service layer through the network.

The common service layer supports various applications, thus forming an architecture of terminal+network+application. For example, in the field of smart home, various household devices can access to the common service platform by local area network (LAN), such as by a wireless method or a wired method; optionally, the local area network may be a personal area network (PAN), for example, taking a wireless personal area network (WPAN) as an example, various technologies such as Bluetooth, IrDA, Home RF, ZigBee, or UWB (Ultra-Wideband Radio) can be adopted to achieve the access.

As mentioned above, in a case where an IOT entity, such as a software module in an IOT terminal device or a node device, transmits data or information to a common service entity, the data or information can be stored as a separate resource. In addition, the IOT entity can send a request to the common service entity, so as to update the resources stored on the common service entity and corresponding to the IOT entity and to reflect the status of the equipment operated by the IOT entity. This update can be real-time or periodic, or be triggered by a certain condition. Therefore, other IOT entities communicating with the common service entity can obtain the status of the equipment corresponding to the IOT entity by accessing to the updated resources; or, other IOT entities communicating with the common service entity can operate on the updated resources. It should be noted that the resources referred to here include resources of various entities (e.g., the entities can be software modules in IOT devices, such as entities like AE, CSE etc.). An entity may represent a software module of a communication device, while the common service entity may represent a software module of a service platform, and the service platform may be local or remote. Optionally, operations on the updated resources include, for example, acquiring information of the updated resources, deleting the information of the updated resources, notifying a third party of the information of the updated resources, or operating on other resources based on the information of the updated resources.

In the present disclosure, the entity, such as application entity AE, a common service entity CSE, and data etc. described here can all be represented by resources. The resource can have a unique identifier, and includes attributes and a sub-resource, the attributes are used to store information related to the resource, the sub-resource is a next level resource of the resource, and the resource includes an index pointing to the sub-resource.

Figure 2:
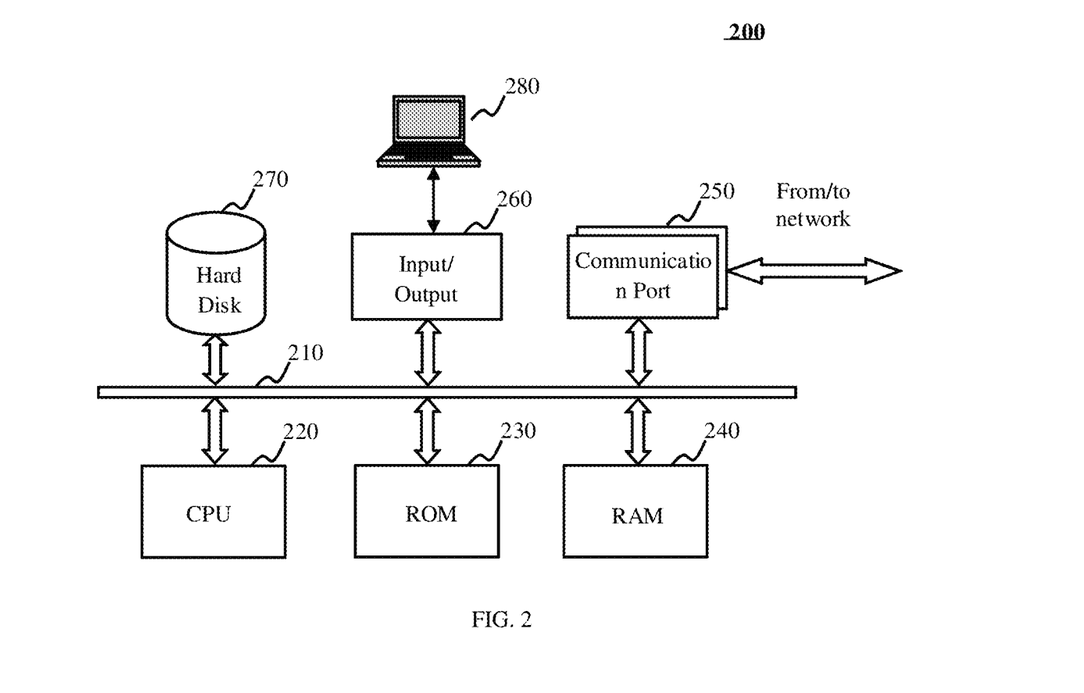
FIG. 2 illustrates a schematic diagram of a server/client device according to embodiments of the present disclosure.

FIG. 2 illustrates a schematic diagram of a server/client device according to embodiments of the present disclosure. In the IOT system, the above-mentioned service platform can be implemented by a server and the above-mentioned terminal device can be implemented by a client device.

FIG. 2 illustrates an architecture of a computer device according to some embodiments of the present disclosure. This kind of computer device can be used to implement a server device or a client device disclosed in the present disclosure. Such computers can include personal computers, notebook computers, tablet computers, mobile phones, personal digital assistance (PDA), smart glasses, smart watches, smart rings, smart helmets, or any smart portable devices or wearable devices. In some embodiments, the architecture of the computer device shown in FIG. 2 can also be used to implement various smart home terminal devices in the IOT system, such as a smart switch, a smart gateway, a smart electric cooker, a smart purifier, etc. In the embodiment of the present disclosure, a hardware platform including a user interface is explained using a functional block diagram. This kind of computer device can be a computer device with a general purpose or a computer device with a special purpose. Both computer devices can be used to implement the server device or the client device of the terminal in the embodiments of the present disclosure. The computer system 200 may implement any component currently described that provides information required for IOT communication. For example, the computer system 200 can be implemented by a computer device through its hardware device, software program, firmware, and a combination thereof. For the sake of convenience, only one computer device is shown in FIG. 2, but the related computer functions described in the embodiments of the present disclosure for providing information required for the communication of the IOT can be implemented by a group of similar platforms in a distributed manner, so as to disperse the processing load of the system.

The computer system 200 may include a communication port 250, to which a network for achieving data communication is connected. The computer system 200 may also include a processor 220 for executing program instructions. The processor 220 may be composed of at least one processor. The computer system 200 may include an internal communication bus 210. The computer system 200 may include different forms of program storage units and data storage units, such as a hard disk 270, a read only memory (ROM) 230, and a random access memory (RAM) 240, and the program storage units and data storage units can be used to store various data files used for computer processing and/or communication, and possible program instructions executed by the processor 220. The computer system 200 may also include an input/output component 260, which supports the input/output data flow between the computer system 200 and other components (such as the user interface 280). The computer system 200 can also send and receive information and data through the communication port 250.

In some embodiments, the above-mentioned computer system 200 can be used to form a server in an IOT communication system. The server of the IOT communication system can be a server hardware device or a server group. Each server in the server group can be connected through a wired or wireless network. A server group can be centralized, such as a data center. A server group can also be distributed, such as a distributed system.

The computer device provided in FIG. 2 can be used to implement the client application entity AE, the client common service entity CSE, the server application entity AE, and/or the server common service entity CSE involved in the present disclosure.

The above description outlines different aspects of the method for providing information required for data communication of the IOT communication and/or the method for implementing other steps through programs. The program portion in the technology may be considered as "product" or "artifact" in the form of executable code and/or related data, and can be participated in or implemented through a computer-readable medium. A tangible and permanent storage medium may include the memory or storage used by any computer, processor, or similar device, or related module. For example, various semiconductor memories, tape drives, disk drives, or any similar devices that can provide storage functions for software.

When the system is congested, in order to alleviate the network load and maintain the data processing capability of the system, the present disclosure provides a new data processing method. With the data processing method provided by the present disclosure, priority can be set for resources to be transmitted in the system. The integrity and timeliness of important data can be guaranteed by processing the resources to be transmitted according to the priority. In addition, with the data processing method provided by the present disclosure, the identifier indicating the resource to be transmitted can be sent to a receiving-terminal first instead of the resource itself, thus alleviating the data burden in the system and minimizing the system congestion.

Figure 3:
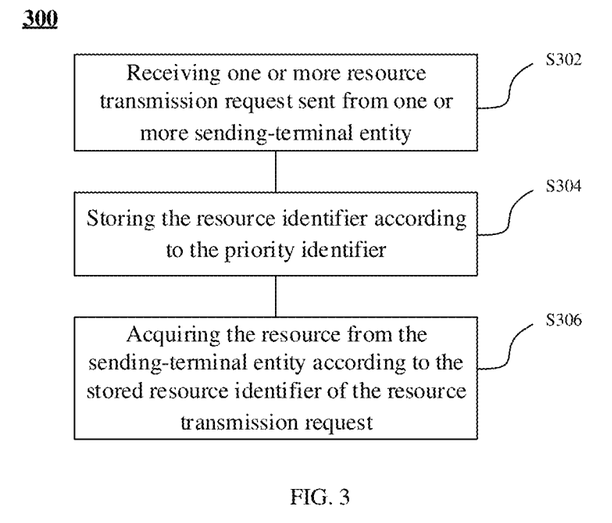
FIG. 3 illustrates an exemplary flowchart of a data communication method according to embodiments of the present disclosure.

FIG. 3 illustrates a flowchart of a data communication method according to embodiments of the present disclosure. The data communication method 300 shown in FIG. 3 can be implemented by any one of aforementioned entities. Hereinafter, an entity for implementing the data communication method 300 is referred to as a "receiving-terminal entity". It should be noted that the "sending-terminal entity" and the "receiving-terminal entity" mentioned in the present disclosure are only used to indicate entities used to implement resource transmitting and resource receiving in a resource data transmission process, but does not mean that the entity is only used to implement the transmitting function or the receiving function. Therefore, the sending-terminal entity in the present disclosure can be implemented as a client or a server, and the receiving-terminal entity can also be implemented as a client or a server. Hereinafter, the principle of the present disclosure will be described by taking the client as the sending-terminal and the server as the receiving-terminal as an example, however, the scope of the present disclosure is not limited to this case.

The data communication method 300 can comprise step S302: receiving at least one resource transmission request sent from at least one entity acting as the sending-terminal, where the resource transmission request comprises a resource identifier associated with a resource to be transmitted and a priority identifier associated with the resource transmission request.

In some embodiments, the at least one resource transmission request may be a request for transmitting resources between the client and the server. For example, the at least one resource transmission request may be a request sent between the application entity/common service entity of the client device and the application entity/common service entity of the server device.

The resource transmission request may at least include a resource identifier associated with the resource to be transmitted. For example, a resource corresponding to the resource identifier can be uniquely determined by the resource identifier. In some embodiments, the resource to be transmitted can be stored in the storage device in association with the resource identifier. When the resource to be transmitted needs to be read, the resource to be transmitted can be searched and retrieved according to the resource identifier, so as to determine the resource to be transmitted according to the resource identifier.

The resource transmission request may at least include a priority identifier associated with the resource transmission request. The priority identifier can be used to indicate the priority of the resource transmission request. The higher the priority, the more important the resource to be transmitted is for the IOT system. In some embodiments, when data congestion occurs, the resource transmission request with higher priority can be processed preferentially.

In some embodiments, the priority of the resource transmission request can be determined according to the type of the resource to be transmitted. For example, for an action resource used to trigger entities to perform specific operations (such as a management command resource (<mgmtCmd>) used to perform the management processes required by existing management protocols, a subscription resource (<subscription>) for service subscription data in the IOT system, etc., the priority of the action resource can be set to the highest priority; for a status resource used to indicate the specific status of the entity (such as location resource (<location>)), the priority of the status resource can be set to the second highest priority, and a priority of a content resource (such as container resources <container> used to share information with other entities, content instance resources <contentInstance>, etc.) for storing the instance content can be set to the lowest priority. According to actual needs, the priority order of resources can be adjusted, for example, the priority of the content resource can be set to the highest, or the priority of the status resource can be set to the highest.

In some embodiments, the priority of the resource transmission request can be determined according to the priority of the resource to be transmitted. In the IOT system, the priority of each resource can be set. For example, if the resource transmission request involves a resource whose operation priority is greater than a certain threshold (e.g., 30), the priority of the resource transmission request can be set to the highest priority. If the resource transmission request involves a resource whose operation priority is within a certain range (e.g., 20-30), the priority of the resource transmission request can be set to the second highest priority. If the resource transmission request involves a resource whose operation priority is lower than a certain threshold (e.g., 20), the priority of the resource transmission request can be set to the lowest priority.

It can be understood by those skilled in the art that the priority of the resource described here (e.g., the priority is greater than 30, the priority is within 20-30, and the priority is less than 20) are only an exemplary description for setting the resource transmission request according to the priority of the resource. According to actual situations, those skilled in the art can set resource transmission requests for resources with different priorities according to different methods. For example, a priority of a resource transmission request involving a resource with an operation priority greater than 40 can be set as the highest priority. A priority of a resource transmission request involving a resource with an operation priority within 15-40 can be set as the second highest priority. A priority of a resource transmission request involving a resource with an operation priority lower than 15 can be set as the lowest priority. Those skilled in the art can set resource transmission requests of different resources to different priorities according to actual needs.

In addition, although in the above description, the priority of the resource transmission request involves only three different levels (the highest priority, the second highest priority, and the lowest priority), the content provided by the present disclosure is not limited to this. According to actual situations, technicians can set different levels of priority for resource transmission requests. Hereinafter, the priority of the resource transmission request can be described as priority 0, 1, and 2, 0 indicates the lowest priority, 1 indicates the second highest priority, and 2 indicates the highest priority. It can be understood that the priority of the resource transmission request may include more or less priorities, such as two or four or more priorities. In some embodiments, a smaller number can be used to indicate a higher priority, for example, 0 can indicate the highest priority and 2 can indicate the lowest priority.

The data communication method 300 can further comprise step S304: storing the resource identifier according to the priority identifier. In some embodiments, storing the resource identifier mentioned here can also refer to storing the resource transmission request itself.

In some embodiments, the received resource transmission requests can be classified according to the priorities of the resource transmission requests. For example, resource transmission requests with the same priority can be determined as the same category, resource transmission requests with different priorities can be determined as different categories, and the resource transmission request can be stored according to the type of the resource transmission request. For example, step S304 may be executed in a case where data congestion occurs in the IOT system, or may also be executed by default.

In some embodiments, a first storage queue may be created at the receiving-terminal entity for resource transmission requests with a first priority, such as a priority of 2. For example, the first storage queue is configured to store resource transmission requests with the priority of 2. In some embodiments, for a plurality of resource transmission requests with the priority of 2 received successively, the resource transmission requests can be sequentially stored in the first storage queue according to a time order in which the resource transmission requests are received. For example, the request received first may be stored in the first storage sequence first. Furthermore, the resource transmission requests in the first storage queue can be processed successively in a first-in-first-out manner. The first-in-first-out manner means that the resource transmission requests that are first stored in the first storage queue will be processed first.

In some embodiments, a second storage queue may be created at the receiving-terminal entity for resource transmission requests with a second priority, such as a priority of 1. The second storage queue is configured to store resource transmission requests with the priority of 1. In some embodiments, after all resource transmission requests with the priority higher than 1 (in the present disclosure, that is the resource transmission requests with the priority of 2) are processed, starting processing the resource transmission requests stored in the second storage. The resource transmission requests in the second storage queue can be processed successively in a first-in-first-out manner. It can be understood by those skilled in the art that a resource transmission request with a priority of 1 can also be set to have a higher priority, and the specific method of indicating the priority is not limited in the present disclosure.

In some embodiments, if there are more other priorities, corresponding storage queues can be created for resource transmission requests with other priorities at the receiving-terminal entity, and the resource transmission requests in each storage queue can be processed successively according to the order of priority.

In some embodiments, the receiving-terminal may discard the resource transmission request with the lowest priority (e.g., the priority is 0) when the network is congested. For example, when the network is congested, the receiving-terminal can directly discard the data of the resource transmission request with the priority of 0, while only save and process the resource transmission requests with higher and highest priorities. In some embodiments, when there are more than four priorities, the receiving-terminal can also discard the data of the resource transmission requests with the priorities that are the lowest two or more priorities. That is to say, when the network is congested, the receiving-terminal may not store the resource transmission requests with the lower priority.

It can be understood that although the principles of the present disclosure have been described in the present disclosure by taking priorities of 0, 1, and 2 as an example, however, it can be understood by those skilled in the art that the priorities involved in the present disclosure can also be expressed in any other form.

The data communication method 300 can further comprise step S306: acquiring the resource from the sending-terminal entity according to the stored resource identifier of the resource transmission request.

In some embodiments, the resource transmission request does not include the specific content of the resource to be transmitted, but only includes the resource identifier associated with the resource to be transmitted and the priority identifier of the resource transmission request. In this way, when network congestion occurs, there will be no congestion due to overfull storage space caused by the failure of processing received data in time, so as to alleviate the problem of further serious congestion caused by excessive data volume.

Because the resource transmission request does not include the specific content of the resource to be transmitted, when processing a resource transmission request, the corresponding resource content can be obtained according to the resource identifier included in the resource transmission request from the entity that sends the resource transmission request. In some embodiments, the resource transmission request can further comprise an entity identifier of the sending-terminal entity that sends the resource transmission request. The identifier of the sending-terminal entity can be stored in a storage queue in association with the resource identifier. When processing the resource transmission request, the location (e.g., in which entity the resource is located) of the resource can be determined according to the entity identifier, and a request for obtaining the resource can be sent to the entity corresponding to the entity identifier.

In some embodiments, the resource identifier can be sent to the corresponding entity, and the corresponding resource can be obtained from the corresponding entity. For example, when the entity corresponding to the resource identifier receives the resource identifier, the entity can search the corresponding resource and send the corresponding resource to the receiving-terminal entity.

In some embodiments, the above resource transmission request can be achieved by congestion control (<CongestionControl>) resources.

Through the data communication method provided by the present disclosure, the data processing pressure of entities can be alleviated when network congestion occurs, and more important resource transmission requests can be prioritized to process by distinguishing priorities, thus achieving more efficient resource transmission and processing when the network congestion occurs.

Figure 4:
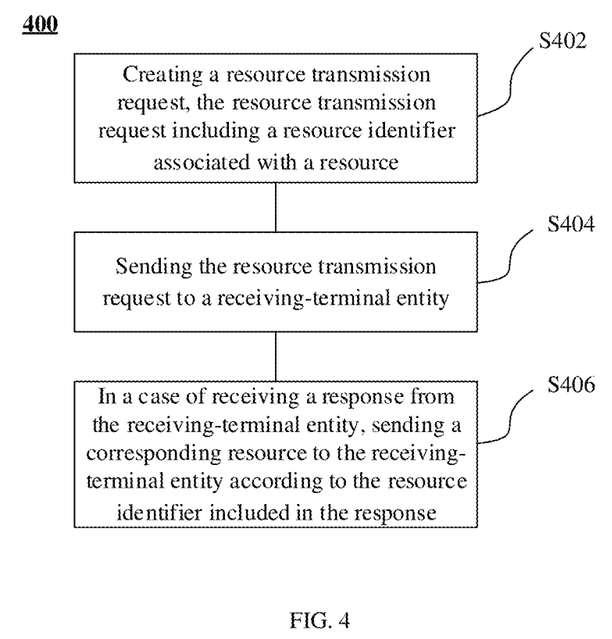
FIG. 4 illustrates an exemplary flowchart of a data communication method according to embodiments of the present disclosure.

FIG. 4 illustrates an exemplary flowchart of a data communication method according to the present disclosure. The flow 400 shown in FIG. 4 can be implemented by any of the aforementioned entities. Hereinafter, an entity for implementing the data communication method 400 will be referred to as a "sending-terminal entity".

The data communication method 400 can comprise step S402: creating a resource transmission request, the resource transmission request including a resource identifier associated with a resource.

In some embodiments, when the sending-terminal entity is ready to send resources to the receiving-terminal entity, a resource transmission request can be created=

For example, the resource transmission request can be implemented as a congestion control resource. The congestion control resource can be set as a sub-resource of the resource to be transmitted.

In some embodiments, the resource identifier associated with the resource to be transmitted can be set in the resource transmission request. That is to say, a resource corresponding to the resource identifier can be uniquely determined through the resource identifier. For example, the resource to be transmitted can be stored in a storage device in association with the resource identifier. When the resource to be transmitted needs to be read, the resource can be searched and retrieved according to the resource identifier, so as to determine the resource to be transmitted according to the resource identifier.

In some embodiments, the resource identifier can be determined by a timestamp. For example, the timestamp corresponding to the time when the sending-terminal entity receives the resource can be determined as the resource identifier for the resource. The timestamp can be generated by using user-defined rules, or a general unix timestamp can also be used. For another example, the timestamp corresponding to the time when the sending-terminal entity receives the resource can also be transformed (e.g., encrypted or mapped), and the result obtained after the transformation is determined as the resource identifier for the resource.

In some embodiments, the resource identifier can also be set according to an identification code of the resource. The identification code of the resource is a unique identifier setting for the resource in the common service entity CSE. For example, the identification code may be an identifier generated by the client CSE according to the identification code allocation rule for uniquely identifying the application entity AE when the client application entity AE requests to establish a resource on the client common service entity CSE. In some embodiments, the resource identification code may be locally unique. For example, in the context of an application entity, each resource has a unique identification code.

In some embodiments, the above resource identifier may be determined by using a combination of a timestamp and a resource identification code. For example, the timestamp and the resource identification code can be combined into a combined character string, and the combined character string or the result transformed according to the combined character string can be set as the resource identifier for the resource.

In some embodiments, the sending-terminal entity may set the priority identifier associated with the resource transmission request in the resource transmission request. The priority identifier can be used to indicate the priority of the resource transmission request. The setting method of the priority has been described in detail above, and will not be repeated here.

In some embodiments, the sending-terminal entity may also set an entity identifier associated with the sending-terminal entity in the resource transmission request. With the entity identifier, the receiving-terminal entity can determine the source of the resource transmission request and send a response to the entity that sends the resource transmission request, so as to obtain the corresponding resource.

The data communication method 400 can further comprise step S404: sending the resource transmission request to a receiving-terminal entity. In some embodiments, the sending-terminal entity only sends the resource transmission request (such as congestion control resource) to the receiving-terminal entity, and does not send the resource content to the receiving-terminal entity together. The sending-terminal entity stores the resource in the memory in association with the resource identifier.

The data communication method 400 can further comprise step S406: in a case of receiving a response from the receiving-terminal entity, sending a corresponding resource to the receiving-terminal entity according to the resource identifier included in the response.

In the case of occurring network congestion, the sending-terminal entity sends the resource identifier that does not include the resource content to the receiving-terminal entity, thus avoiding system congestion caused by overfull storage space at the receiving-terminal entity due to excessive data volume. The receiving-terminal entity can store and process the resource transmission requests in sequence. When starting to process the resource transmission request, the receiving-terminal entity can send the resource identifier to the sending-terminal entity by sending a response to the sending-terminal entity. The sending-terminal entity can query the corresponding resource content according to the resource identifier and send the corresponding resource to the receiving-terminal entity.

In some embodiments, the congestion control resource can be stored as a sub-resource of the resource to be transmitted, and the resource identifier, the priority identifier, and the sending-terminal identifier can be set as attributes of the congestion control resource.

After the sending-terminal entity receives the resource identifier sent by the receiving-terminal entity, the sending-terminal entity can retrieve all the resources stored in the storage unit of the sending-terminal entity and find out the resource which contains the congestion control sub-resource, and then compare whether the resource identifier (e.g., timestamp attribute) in the congestion control sub-resource of this resource is consistent with the received resource identifier sent by the receiving-terminal entity. If the judgment result is consistent, the sending-terminal entity will send the resource to the receiving-terminal entity.

In some embodiments, the sending-terminal entity may include a sending-terminal application entity AE and a sending-terminal common service entity CSE. The data communication method 400 can further comprise: sending a resource to be sent to the sending-terminal common service entity CSE through the sending-terminal application entity AE, and generating a resource transmission request for the resource through the sending-terminal common service entity CSE.

In some embodiments, the sending-terminal application entity AE can set the priority of the resource transmission request for the resource according to the type of the resource or the priority of the resource, and send the set priority together with the resource to the sending-terminal common service entity CSE. In other embodiments, when generating the resource transmission request, the sending-terminal common service entity CSE sets the priority of the resource transmission request according to the type of the resource or the priority of the resource.

The sending-terminal common service entity CSE can be used to set the resource identifier of the resource. For example, the sending-terminal common service entity CSE can generate a timestamp according to the receiving time when receiving the resource, and determine the resource identifier of the resource according to the timestamp.

The sending-terminal common service entity CSE can store the resources in the storage unit in association with the resource identifiers of the resources.

The sending-terminal common service entity CSE may send the generated resource transmission request to the receiving-terminal entity, and receive a response from the receiving-terminal entity. The response may include the resource identifier. The sending-terminal common service entity CSE can search and retrieve the resource stored in association with the resource identifier in the storage unit according to the resource identifier, and send the resource to the receiving-terminal entity, thereby completing the operation of resource transmission.

Through the data communication method provided by the present disclosure, the data processing pressure of entities can be alleviated when the network congestion occurs, and more important resource transmission requests can be prioritized to process by distinguishing priorities, thus achieving more efficient resource transmission and processing when the network congestion occurs.

The data communication methods shown in FIG. 3 and FIG. 4 can be used when the network congestion occurs. The data communication methods can determine whether there is a network congestion based on a threshold preset by the user. For example, when the data communication rate in the network drops below a preset rate, it can be considered that the network congestion has occurred, and the data communication methods shown in FIG. 3 and FIG. 4 can be performed. For another example, when the free space of the storage unit of the receiving-terminal entity drops below a certain threshold, it can be considered that the network congestion has occurred, and the data communication methods shown in FIG. 3 and FIG. 4 can be performed.

Figure 5:
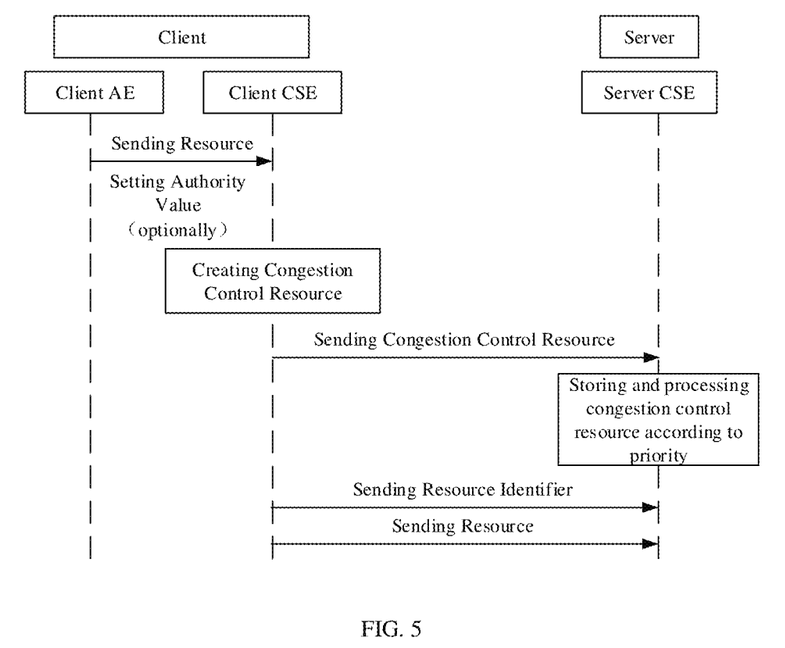
FIG. 5 illustrates an example of a communication method according to embodiments of the present disclosure.

FIG. 5 illustrates an exemplary schematic diagram of a resource transmission process according to embodiments of the present disclosure.

As illustrated in FIG. 5, the IOT system may include a client and a server, the client may include a client application entity AE and a client common service entity CSE. In some examples, the client application entity AE can be implemented as a smart home device such as a smart speaker, a smart switch, or a smart electric cooker. The client common service entity CSE can be implemented as a home gateway. The server may include a server common service entity CSE. For example, the data of the smart home device can be sent to the server to achieve the upload and update of the information.

In the example shown in FIG. 5, the resource transmission can be achieved from the client to the server.

As shown in FIG. 5, the client application entity AE sends a data packet of the resource to the client common service entity CSE, and sets, in the data packet, a priority for indicating a resource transmission request for the resource. The level of the priority can be expressed by the authority value attribute. For example, the authority value attribute can be set to 0, 1, or 2, which respectively represents the lowest priority, the second highest priority, and the highest priority. As mentioned above, the authority value can be set according to the type of the resource or the priority of the resource, which will not be repeated here.

According to the resource sent by the client application entity AE to the client common service entity CSE, the client common service entity can create a congestion control resource for the resource. The congestion control resource may include at least three attributes: an authority value, a client identifier, and a resource identifier.

The authority value can be set by the client application entity AE and sent to the client common service entity CSE together with the resource as described above. In other examples, the authority value can also be set by the client common service entity CSE according to the type of the resource or the priority of the resource.

The resource identifier can be represented by a timestamp generated by the client common service entity CSE according to the time when the resource from the client application entity AE is received. The assignment method of the timestamp can be determined in a user-defined way, so as to generate the resource identifier. For example, the time of receiving the resource can be mapped to a character string, and the character string serves as the resource identifier. Or the resource identifier can be determined by the universal unix timestamp. The client common service entity CSE may store the resource identifier in the storage unit in association with the corresponding resource.

In addition, the congestion control resource may also include a client identifier, the server can determine the client sending the congestion control resource using the client identifier. The client identifier may be a firmware identifier or a hardware identifier of a client common service entity.

After generating the congestion control resource, the client common service entity can send the congestion control resource to the server common service entity CSE.

After the server common service entity CSE receives the congestion control resource, the server common service entity CSE can parse the congestion control resource and classify the congestion control resource according to the authority value included in the congestion control resource.

When the network congestion occurs, the server common service entity CSE will respectively create storage queues for the congestion control resources with different authority values. For example, the server common service entity CSE can create a first storage queue for congestion control resources with an authority value of 2 and create a second storage queue for congestion control resources with an authority value of 1. The server common service entity CSE stores the congestion control resources with an authority value of 2 in the first storage queue and the congestion control resources with an authority value of 1 in the second storage queue according to the order in which the congestion control resources are received. The server common service entity CSE processes the congestion control resources in the first storage queue first and then processes the congestion control resources in the second storage queue according to the first-in-first-out manner. The first-in-first-out manner means that the resource entering the storage sequence first will be processed first.

In some examples, the server common service entity CSE can create a third storage queue for congestion control resources with an authority value of 0, and processes the resources in the third storage queue after processing the resources in the first storage queue and the resources the second storage queue. In some examples, if the network is seriously congested, the server common service entity CSE can discard the data of congestion control resources with an authority value of 0, that is, does not save the data of the congestion control resources with an authority value of 0.

In some embodiments, the above storage queue can store the resource identifier and the client identifier included in the congestion control resource. The server common service entity CSE can read the resource identifier and the client identifier included in the resource currently processed, and send the corresponding resource identifier to the client according to the client identifier, for example, send to the client common service entity CSE.

After the client receives the resource identifier sent by the server common service entity, the client queries the resource corresponding to the resource identifier and sends the resource to the server.

In some embodiments, after the client receives the resource identifier sent by the server common service entity, the client can retrieve all the resources stored in the storage unit of the client and find out which resource contains the congestion control sub-resource, and then compare whether the resource identifier (e.g., timestamp attribute) in the congestion control sub-resource of this resource is consistent with the resource identifier of the congestion control sub-resource from the server common service entity CSE. If the judgment result is consistent, the client common service entity will send the resource to the server common service entity CSE.

So far, a complete resource transmission process has been completed.

Figure 6:
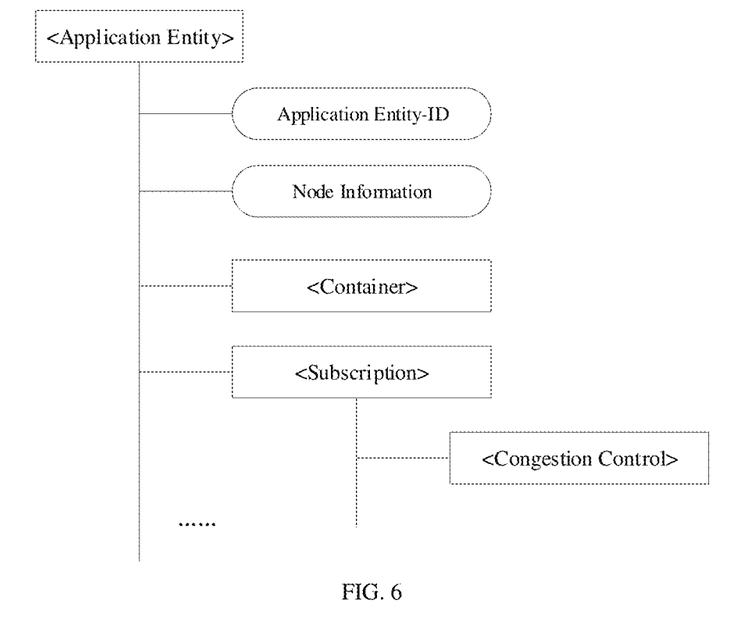
FIG. 6 illustrates an example of an application entity resource according to embodiments of the present disclosure.

FIG. 6 illustrates an example of an application entity resource stored in a client common service entity according to embodiments of the present disclosure. As shown in FIG. 6, the application entity resource can include an application entity identification (ID), a resource identifier nodeLink of a <node> resource representing specific information of nodes, and sub-resource(s), such as subscription resource <subscription>, a resource <container> for sharing data instance (s) among entities, and so on, of the application entity resource. As shown in the figure, the subscription resource may include a <congestion control> sub-resource. The <congestion control> sub-resource stores the authority value of the subscription resource, the client identifier corresponding to the subscription resource, and the resource identifier for the subscription resource. According to the principle of the present disclosure, when the sending-terminal wants to send the subscription resource to the receiving-terminal, the sending-terminal does not directly send the resource content of the subscription resource to the receiving-terminal, but sends the congestion control sub-resource of the subscription resource as a resource transmission request to the receiving-terminal. When the receiving-terminal can process the transmission of the subscription resource, the receiving-terminal can request the resource to be transmitted from the corresponding sending-terminal according to the resource identifier included in the congestion control sub-resource.

According to another aspect of the present disclosure, a computer-readable storage medium on which computer program instructions are stored is provided, when the computer program instructions are executed by a processor, the data communication method as described above is implemented.

According to another aspect of the present disclosure, a server device is provided. The server device can comprise a processor, and is configured to make the server device execute the data communication method as described in FIG. 3 when the computer program instructions are read by the processor.

According to another aspect of the present disclosure, a client device is provided. The client device can comprise a processor, and is configured to make the client device execute the data communication method as described in FIG. 4 when the computer program instructions are read by the processor.

A computer-readable medium may have many forms, including tangible storage medium, carrier wave medium, or physical transmission medium, etc. Stable storage media can include: optical disks or magnetic disks, and storage systems, which are used in other computers or similar devices and can achieve the system components described in the figures. Unstable storage media can include a dynamic memory, such as a main memory of a computer platform. The tangible transmission medium can include coaxial cables, copper cables, and optical fibers, such as lines forming buses inside a computer system. The carrier wave transmission medium can transmit electrical signals, electromagnetic signals, sound wave signals, or light wave signals. These signals can be generated by a method of radio frequency or infrared data communication. Common computer-readable media include a hard disk, a floppy disk, a magnetic tape, and any other magnetic media; a CD-ROM, DVD, DVD-ROM, or any other optical media; a punch card, or any other physical storage media containing pinhole pattern; RAM, PROM, EPROM, FLASH-EPROM, or any other memory chips or tapes; a carrier wave for transmitting data or instructions, a cable or a connecting device for transmitting the carrier waves, and any other program codes and/or data that can be read by a computer. Many of these forms of computer-readable media appear in the process of executing instructions and delivering one or more results by the processor.

In the present application, "module" refers to a set of software instructions or a logic stored in hardware or firmware. The "module" referred to herein can be executed by software and/or hardware modules, or stored in any non-temporary computer-readable medium or other storage device. In some embodiments, a software module can be compiled and connected to an executable program. Obviously, the software module here can respond to information transmitted by itself or other modules, and/or can respond when certain events or interrupts are detected. The software module may be provided on a computer-readable medium, and the software module may be configured to perform operations on a computing device (such as the processor 220). Here, the computer-readable medium can be an optical disk, a digital optical disk, a flash disk, a magnetic disk, or any other kind of tangible medium. The software module can also be acquired through a mode of digital download (the digital download here also includes data stored in a compressed package or an installation package, and the data needs to be decompressed or decoded before executing the data). The code of the software module here can be partially or completely stored in the storage device of the computing device that performs the operation and applied in the operation of the computing device. Software instructions may be embedded in firmware, such as erasable programmable read only memory (EPROM). Obviously, the hardware module may include logic units connected together, such as gates and flip-flops, and/or may include programmable units, such as programmable gate arrays or processors. The functions of the modules or computing devices described herein are preferably implemented as software modules, but may also be represented in hardware or firmware. Generally speaking, the module mentioned here is a logical module, which is not limited by its specific physical form or memory. A module can be combined with other modules or divided into a series of sub-modules.

All or part of the software may sometimes communicate through a network, such as the Internet or other communication networks. Such communication can load a software from one computer device or processor to another computer device or processor. For example, the software is loaded from a server or a host computer of the IOT communication system to a hardware platform of a computer environment, or to other computer environments for implementing the system, or to system providing similar functions related to information required by the IOT communication system. Therefore, another medium capable of transmitting software elements can also be used as a physical connection between local devices, such as light waves, electric waves, electromagnetic waves, etc., which can be propagated through cables, optical cables, air, or the like. Physical media, such as cables, wireless connections, optical cables, or the similar devices, used for carrier waves can also be considered as media that carry software. As used herein, unless the tangible "storage" medium is limited, other terms representing the computer or machine "readable medium" refer to the medium that participates in the process of executing any instruction by the processor.

Unless otherwise defined, all terms (including the technical terms and the scientific terms) used herein have the same meanings as commonly understood by one of ordinary skill in the art to which the present disclosure belongs. It should also be understood that, for example, those terms defined in ordinary dictionaries should be interpreted as having meanings consistent with their meanings in the context of related technologies, and should not be interpreted in idealization or extremely formalization meanings unless explicitly defined as such here.

What have been described above are an explanation of the present disclosure and should not be considered as a limitation on the present disclosure. Although several exemplary embodiments of the present disclosure have been described, those skilled in the art should readily understand that many modifications can be made to the exemplary embodiments without departing from the novel teachings and advantages of the present disclosure. Therefore, all these modifications are intended to be included in the protection scope of the present disclosure defined by the claims. It should be understood that the above is an explanation of the present disclosure, the present disclosure should not be considered as being limited to the specific embodiments disclosed, and modifications to the disclosed embodiments and other embodiments are intended to be included in the scope of the appended claims. The present disclosure is defined by the claims and their equivalents.

What is claimed is:

1. A data communication method, comprising:
receiving at least one resource transmission request sent from at least one entity, wherein the resource transmission request comprises a resource identifier associated with a resource of the at least one entity and a priority identifier associated with the resource transmission request, wherein the resource transmission request is implemented as a congestion control resource, the congestion control resource is set as a sub-resource of the resource, attributes of the congestion control resource comprise the resource identifier, the priority identifier, and an identifier of the at least one entity which is a sending-terminal, and the priority identifier is determined according to a type of the resource or a priority of the resource;
storing the resource identifier according to the priority identifier; and
acquiring the resource from the at least one entity according to the resource identifier that is stored,
wherein the at least one resource transmission request at least comprises at least one resource transmission request with a first priority and at least one resource transmission request with a second priority,
acquiring the resource from the at least one entity according to the resource identifier that is stored, comprises:
after acquiring a resource corresponding to the at least one resource transmission request with the first priority from the at least one entity, acquiring a resource corresponding to the at least one resource transmission request with the second priority from the at least one entity.

2. The data communication method according to claim 1, further comprising:

establishing a first storage queue, which is configured to store a resource transmission request with the first priority; and establishing a second storage queue, which is configured to store a resource transmission request with the second priority.

3. The data communication method according to claim 1, further comprising:

discarding a resource transmission request with a third priority in the resource transmission request.

4. The data communication method according to claim 2, further comprising:

processing the resource transmission request with the first priority in the first storage queue in a first-in-first-out manner, wherein the resource transmission request with the first priority is sequentially stored into the first storage queue according to an order in which the resource transmission request is received, and the resource transmission request in the first storage queue is sequentially processed according to an order in which the resource transmission request in the first storage queue is stored.

5. The data communication method according to claim 1, wherein acquiring the resource from the at least one entity according to the resource identifier that is stored, comprises:

sending the resource identifier to the at least one entity; and receiving the resource corresponding to the resource identifier sent by the at least one entity.

6. The data communication method according to claim 1, wherein the resource identifier is determined according to a timestamp and/or according to a resource identification code of the resource.

7. The data communication method according to claim 1, wherein receiving at least one resource transmission request sent from at least one entity comprises:

receiving the at least one resource transmission request sent from the at least one entity when congestion occurs.

8. The data communication method according to claim 2, further comprising:

discarding a resource transmission request with a third priority in the resource transmission request.

9. The data communication method according to claim 1, wherein acquiring the resource from the at least one entity according to the resource identifier that is stored, comprises:

sending the resource identifier to the at least one entity; and receiving the resource corresponding to the resource identifier sent by the at least one entity.

10. A server device, comprising a processor, and the processor being configured to execute the data communication method according to claim 1.

11. A non-transitory computer-readable storage medium, on which computer program instructions are stored, wherein when the computer program instructions are executed by a processor, the data communication method according to claim 1 is achieved.

* * * * *